Patented Feb. 1, 1949

2,460,785

UNITED STATES PATENT OFFICE 2,460,785

PROCESSES FOR PREPARING SUBSTITUTED PROPANOIC ACID

Earl Pierson, Harrisonburg, Va., and Max Tishler, Rahway, N. J., assignors to Merck & Co., Inc., Rahway, N. J., a corporation of New Jersey No Drawing. Application March 14, 1946, Serial No. 654,503

3 Claims. (Cl. 260—534)

This invention is concerned generally with a novel process for preparing intermediates useful in the synthesis of the growth-promoting factor biotin. More particularly it relates to an improved method for the manufacture of 2-amino-3-carboxymethylmercapto-propanoic acid.

Biotin is known to be one of the isomers of the chemical compound 2 - (4'-carboxy-butyl) -3:4-ureido-tetrahydrothiophene, having the empirical formula $C_{10}H_{16}O_3N_2S$ and the structural formula:

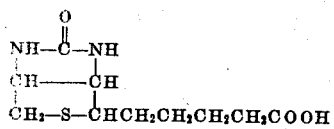

This compound can be synthesized from the aforementioned 2-amino-3 - carboxymethylmercapto-propanoic acid as described in copending applications Ser. Nos. 554,449; 554,451; 554,452; 554,453; 554,454; 554,455; 554,456; and 554,457, all filed September 16, 1944.

It is known that 2 - amino-3 - carboxymethylmercaptopropanoic acid can be obtained by reacting a halo-acetic acid with 2-amino-3-mercapto-propanoic acid (J. Biol. Chem. 106, 331 (1934)). The latter compound has been prepared by reduction of the naturally occurring amino acid, cystine, by catalytic methods and by means of metals in acid solution, but it has not heretofore been prepared by reduction of cystine in aqueous alkaline solution in view of the well known instability of both cystine and 2-amino-3-mercapto-propanoic acid to hot aqueous alkali. Cystine has been reduced by reaction with sodium in liquid ammonia, but this operation is costly and hazardous for commercial operation. None of these prior art processes is suitable for large scale manufacturing operations since it is very difficult to recover the 2-amino-3-mercapto-propanoic acid, or salts thereof in good yield and in pure form. When the 2-amino-3-mercapto-propanoic acid prepared by one of the above methods is coupled with chlor-acetic acid the maximum overall yield of 2-amino-3-carboxymethylmercapto-propanoic acid obtainable from the cystine starting material is about 55% of theory.

The present invention is concerned with a novel one-step process whereby 2-amino-3-carboxymethylmercapto-propanoic acid is prepared from cystine in yields of 90% or more of that theoretically obtainable. This process involves the simultaneous reduction of the cystine and the coupling of the reduction product 2-amino-3-mercapto-propanoic acid with monohalo-acetic acid; it is further discovered that the reaction is conveniently conducted in an aqueous alkaline medium. In carrying out the presently invented process, the cystine and a halo-acetic acid, as for example, α-chloracetic acid, α-bromacetic acid and the like, are dissolved in an aqueous alkaline solution; a metal reducing agent is then added, and the mixture agitated until reaction is complete. The excess metal is then removed, the filtrate acidified and cooled, whereupon substantially pure 2 - amino-3-carboxymethylmercapto-propanoic acid precipitates out and is recovered by filtration and dried.

The aqueous alkaline solution used in the reaction can be prepared using any alkali metal oxide or hydroxide, such as sodium hydroxide, potassium hydroxide, and the like, or mixtures thereof. It is preferred to use an amount of aqueous alkaline solution slightly in excess of that needed to dissolve the reactants but larger quantities may be employed if desired. Metals which can be used in applicant's process are those capable of forming amphoteric oxides and hydroxides, and which are capable of functioning as reducing agents in alkaline solution, such as zinc, aluminum and the like. The reduction can be effected by the appropriate metal reducing agent in massive form, but is best carried out using finely divided metal, preferably in the form of dust. The reaction temperature can be varied over wide limits, but is preferably maintained between about 0° C. and 30° C.

The following example illustrates a method of carrying out the present invention, but it is to be understood that it is given by way of illustration and not of limitation.

Example

About 50 grams of cystine, about 50 grams of chloracetic acid and about 500 cc. of water are charged to a reaction vessel equipped with an agitator. To this mixture is then added with constant stirring about 135 cc. of 30% sodium hydroxide solution while maintaining the temperature below about 30° C.

About 100 grams of zinc dust is then added to the resulting solution and the suspension is stirred for approximately 45 minutes while maintaining the temperature at approximately 30° C. The excess zinc is then removed and the filtrate acidified with about 30 cc. of concentrated sulfuric acid to a pH of about 2. After stirring the resulting solution for about 1 hour at 15–20° C., the precipitated 2-amino-3-carboxymethyl - mercapto-propanoic acid (melting point 188–191° C.) (with decomposition) is removed and dried by conventional operations. The yield of product obtained by this process is about 90%.

Modifications may be made in carrying out the present invention without departing from the spirit and scope thereof, and this invention is to be limited only by the appended claims.

We claim:

1. The process of preparing 2-amino-3-carboxymethylmercapto-propanoic acid which comprises reacting together cystine, chloracetic acid and zinc, said reaction being carried out by bringing together zinc and a solution of cystine and chloracetic acid in an aqueous alkali metal hydroxide.

2. The process which comprises reacting cystine and chloroacetic acid in aqueous sodium hydroxide solution with zinc at a temperature between about 0° C. and 30° C., to produce 2-amino-3-carboxymethylmercapto-propanoic acid.

3. The process of preparing 2-amino-3-carboxy-methylmercapto-propanoic acid which comprises reacting together cystine, chloracetic acid and zinc dust, said reaction being carried out by adding zinc dust to a solution of cystine and chloracetic acid in aqueous sodium hydroxide, at a temperature of approximately 30° C.

EARL PIERSON.
MAX TISHLER.

REFERENCES CITED

The following references are of record in the file of this patent:

Du Vigneaud et al., "Jour Am. Chem. Soc.," vol. 52, (1930), pages 4500–4524.

Rapkine, "Chemical Abstracts," vol. 27, (1933), page 2969, abstract of Comptes Rendus Soc. Bio., vol. 112 (1933), pages 790–792.

Dickens, "Chemical Abstracts," vol. 28, (1934) page 1061, abstract of Biochem. J., vol. 27 (1933), pages 1141–1151.

Miller et al., "Jour. Am. Chem. Soc.," vol. 56, (1934), pages 935–937.

Michaelis et al., "J. Bio. Chem.," vol. 106, (1934), pages 331–334.

Euler, "Chemical Abstracts," vol. 29, (1935), page 2826.

Abstract of Z. Physik. Chem. A 171, (1934), pages 379–384.

Harris et al., "Jour Am. Chem. Soc.," vol. 66, (1944), pages 1757–1759.